(12) United States Patent
Hattori

(10) Patent No.: US 12,086,477 B2
(45) Date of Patent: *Sep. 10, 2024

(54) PRINTING DEVICE MODIFYING DISPLAY MODE FOR CUMULATIVE VALUE OF PRINTING COUNT

(71) Applicant: BROTHER KOGYO KABUSHIKI KAISHA, Nagoya (JP)

(72) Inventor: Yuka Hattori, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,020

(22) Filed: Aug. 1, 2023

(65) Prior Publication Data

US 2023/0409249 A1 Dec. 21, 2023

Related U.S. Application Data

(63) Continuation of application No. 17/479,099, filed on Sep. 20, 2021, now Pat. No. 11,782,650.

(30) Foreign Application Priority Data

Sep. 30, 2020 (JP) ................................ 2020-165325

(51) Int. Cl.
*G06F 3/12* (2006.01)
*G06Q 30/04* (2012.01)
*H04N 1/00* (2006.01)

(52) U.S. Cl.
CPC .......... *G06F 3/1204* (2013.01); *G06F 3/1229* (2013.01); *G06Q 30/04* (2013.01); *H04N 1/00143* (2013.01); *H04N 1/00411* (2013.01)

(58) Field of Classification Search
None
See application file for complete search history.

(56) References Cited

U.S. PATENT DOCUMENTS 7,085,503 B2  8/2006  Mokuya
8,947,694 B2  2/2015  Honda et al.
(Continued)

FOREIGN PATENT DOCUMENTS

JP   H08-339136 A   12/1996
JP   2005-132023 A   5/2005
(Continued)

OTHER PUBLICATIONS

Office Action dated Dec. 22, 2023 received from the Japanese Patent Office in related JP 2020-165325 together with English language translation.

(Continued)

*Primary Examiner* — Henok Shiferaw
(74) *Attorney, Agent, or Firm* — Scully, Scott, Murphy & Presser, PC

(57) ABSTRACT

A printing device includes a display and a controller. The controller performs a counting process to increment a cumulative value of a printing count each time printing is performed by the printing device. The controller performs a first display control process to display on the display the cumulative value of the printing count which is incremented in the counting process. The controller performs a display mode modification process to modify a display mode for the cumulative value of the printing count displayed on the display when a printing agreement is established for a subscription. The printing agreement is for charging fees depending on a printing count within a specific interval.

18 Claims, 14 Drawing Sheets

(56) References Cited

U.S. PATENT DOCUMENTS

| | | |
|---|---|---|
| 11,340,851 B1 | 5/2022 | Zakharov |
| 2006/0218272 A1 | 9/2006 | Murakami |
| 2007/0160378 A1* | 7/2007 | Matsuda ................ G03G 21/02 399/79 |
| 2012/0053885 A1 | 3/2012 | Kato |
| 2014/0029042 A1 | 1/2014 | Yoshida et al. |
| 2016/0255209 A1 | 9/2016 | Zakharov |
| 2016/0292550 A1* | 10/2016 | Kawai ................ G06K 15/102 |
| 2016/0292772 A1 | 10/2016 | Nagasaki |
| 2017/0048416 A1 | 2/2017 | Cho et al. |
| 2017/0063646 A1 | 3/2017 | Kawai |
| 2017/0090830 A1* | 3/2017 | Tomono ................ G06F 3/1235 |
| 2017/0171400 A1* | 6/2017 | Zakharov ........... H04N 1/00042 |
| 2018/0268493 A1* | 9/2018 | Kamijima .............. H04N 1/346 |
| 2018/0314468 A1 | 11/2018 | Osadchyy et al. |
| 2020/0042673 A1 | 2/2020 | Kidokoro |
| 2022/0137897 A1* | 5/2022 | Hattori ................ G06F 3/1229 358/1.15 |

FOREIGN PATENT DOCUMENTS

| | | |
|---|---|---|
| JP | 2005-193513 A | 7/2005 |
| JP | 2006-263963 A | 10/2006 |
| JP | 2016-022599 A | 2/2016 |
| JP | 2017-049767 A | 3/2017 |

OTHER PUBLICATIONS

Office Action dated Aug. 17, 2022 from parent U.S. Appl. No. 17/479,099.

Office Action dated Jan. 17, 2023 from parent U.S. Appl. No. 17/479,099.

Notice of Allowance dated May 24, 2023 from parent U.S. Appl. No. 17/479,099.

* cited by examiner

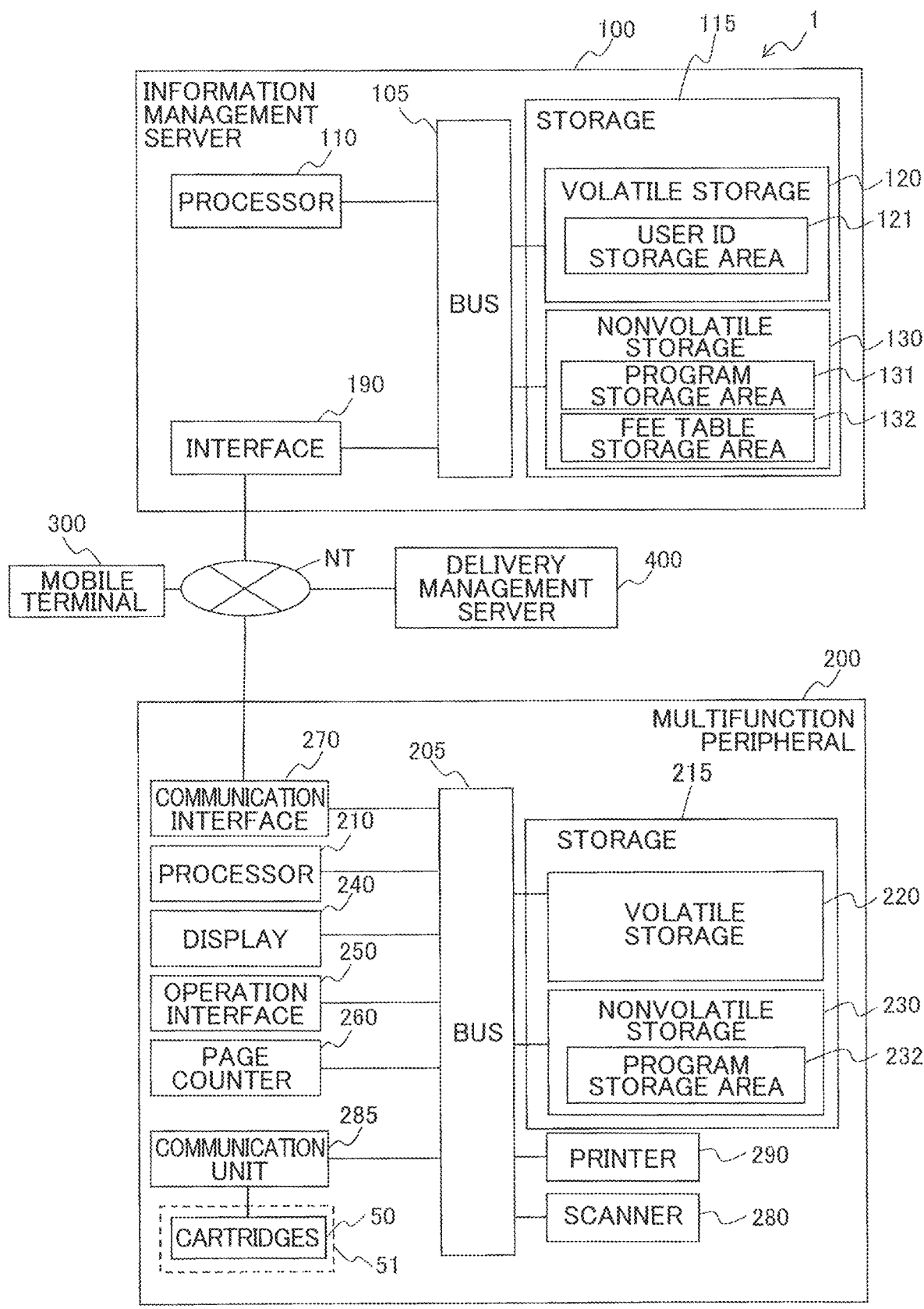

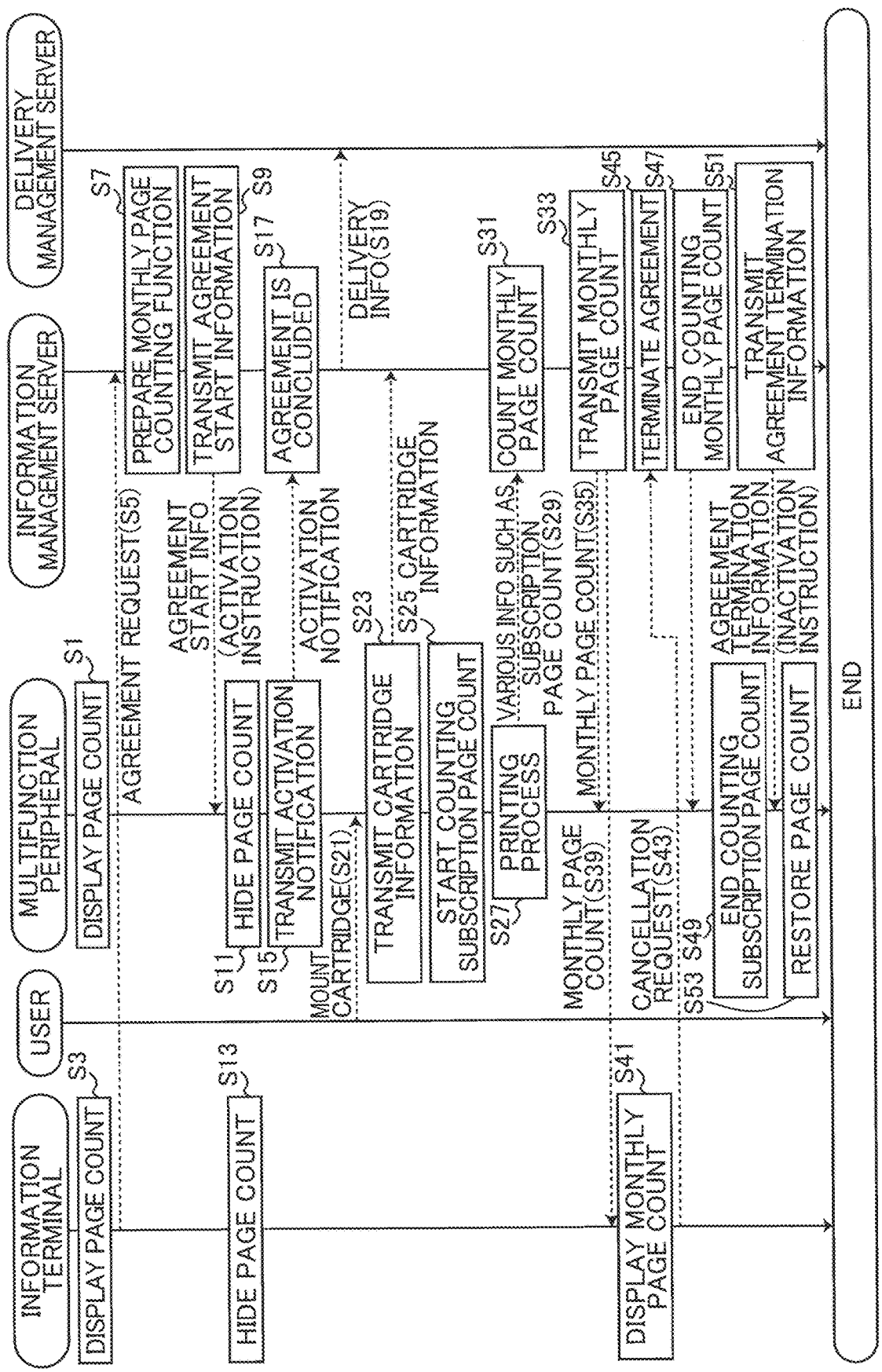

FIG. 15

DISPLAY MODE OF MULTIFUNCTION PERIPHERAL
AFTER PRINTING AGREEMENT IS ESTABLISHED

|   | PAGE COUNT | SUBSCRIPTION PAGE COUNT | MONTHLY PAGE COUNT |
|---|---|---|---|
| A | × | × | × |
| B | × | △ | ○ |
| C | × | ○ | △ |

○ : DISPLAYED
× : NOT DISPLAYED OR HIDDEN
△ : EITHER WILL DO

DISPLAY MODE OF INFORMATION TERMINAL
AFTER PRINTING AGREEMENT IS ESTABLISHED

|   | PAGE COUNT | SUBSCRIPTION PAGE COUNT | MONTHLY PAGE COUNT |
|---|---|---|---|
| A | × | × | ○ |
| B | × | △ | ○ |
| C | × | ○ | △ |

○ : DISPLAYED
× : NOT DISPLAYED OR HIDDEN
△ : EITHER WILL DO

PRINTING DEVICE MODIFYING DISPLAY MODE FOR CUMULATIVE VALUE OF PRINTING COUNT

REFERENCE TO RELATED APPLICATIONS

This application is a continuation of U.S. patent application Ser. No. 17/479,099, filed Sep. 20, 2021, which claims priority from Japanese Patent Application No. 2020-165325 filed Sep. 30, 2020. The entire contents of the aforementioned applications are incorporated herein by reference.

BACKGROUND ART

Technical Field

The present disclosure relates to a printing device to print an image on a printing medium and a printing program.

Background

Conventionally, printers that receive image data and print images on printing media based on the image data have been provided with a page counter for counting the number of pages that are printed.

DESCRIPTION

Summary

The normal page counting function provided in such conventional printing devices normally adds page numbers successively to a cumulative page count stored on the printing device and displays this cumulative value on a display of the printing device in response to a prescribed operation, for example.

In recent years, users of some such printing devices may enter an agreement with a service provider to use a printer that the service provider owns. The user pays the service provider a fee based on printing content within a specific interval. For this purpose, separately from the page counting function described above, the printing device is provided with a function for counting the number of pages printed within the specific interval. The counter is reset each time the specific interval has elapsed. Accordingly, the count value of this function differs from the count value of the normal page counting function described above. Naturally, a user who has entered an agreement as described above will be concerned with the number of pages the user has printed within the current specific interval since this number will be directly linked to the user's charges. However, since the count value of the normal page counting function may be mistaken as the count value for pages printed during the specific interval, the user may become confused.

In view of the foregoing, it is an object of the present disclosure to provide a printing device and printing program capable of preventing confusion for a user using the printing device under the agreement.

In order to attain the above and other objects, the disclosure provides a printing device configured to print an image on a printing medium. The printing device includes a display; and a controller. The controller is configured to perform: a counting process to increment a cumulative value of a printing count each time printing is performed by the printing device; a first display control process to display on the display the cumulative value of the printing count which is incremented in the counting process; and a display mode modification process to modify a display mode for the cumulative value of the printing count displayed on the display when a printing agreement is established for a subscription, the printing agreement being for charging fees depending on a printing count within a specific interval.

According to another aspect, the disclosure provides a non-transitory computer readable storage medium storing a set of program instructions installed on and executed by a computer included in a printing device configured to print an image on a printing medium. The printing device includes a display configured to display a cumulative value of a printing count printed by the printing device. The set of program instructions includes: a counting process to increment the cumulative value of the printing count each time printing is performed by the printing device; a first display control process to display on the display the cumulative value of the printing count which is incremented in the counting process; and a display mode modification process to modify a display mode for the cumulative value of the printing count displayed on the display when a printing agreement is established for a subscription, the printing agreement being for charging fees depending on a printing count within a specific interval.

BRIEF DESCRIPTION OF THE DRAWINGS

The particular features and advantages of the disclosure as well as other objects will become apparent from the following description taken in connection with the accompanying drawings, in which:

FIG. 1 is a block diagram illustrating overall structures of a printing system according to an embodiment;

FIG. 2 is a sequence chart illustrating processes executed by an information terminal, a multifunction peripheral, an information management server, and a delivery management server;

FIG. 15 includes tables illustrating typical combinations of the page count, the subscription page count, and the monthly page count.

DETAILED DESCRIPTION

Figure 3A:
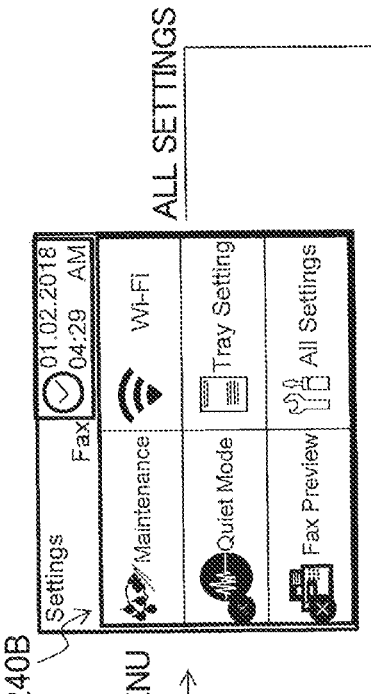
FIG. 3A-3E are explanatory diagrams illustrating operations to display a page count and transitions of screens on a display in the multifunction peripheral.

FIG. 1 shows a printing system according to an embodiment of the present disclosure. In the embodiment, a printing system 1 can provide a printing service to users, i.e., customers. Through this service, the user pays a fee to use the printing function of a multifunction peripheral 200. Specifically, the user enters a printing agreement whereby a fee is charged based on the number of pages printed within a specific interval.

Overview of the Printing System

As shown in FIG. 1, the printing system 1 includes an information management server 100, the multifunction peripheral 200, a mobile terminal 300, and a delivery management server 400. The information management server 100, the multifunction peripheral 200, the mobile terminal 300, and the delivery management server 400 are interconnected over a network NT and are capable of communicating with each other. The multifunction peripheral 200 is an example of the printing device.

Information Management Server

The information management server 100 is installed and managed by the manufacturer of the multifunction peripheral 200, for example. The information management server 100 has a processor 110, a storage 115, and an interface 190. The processor 110, the storage 115, and the interface 190 are interconnected via a bus 105.

The storage 115 is provided with a volatile storage 120, and a nonvolatile storage 130. The volatile storage 120 is DRAM, for example, and has a user ID storage area 121. The volatile storage 120 saves a subscription page count received from the multifunction peripheral 200. The nonvolatile storage 130 is a hard disk drive or solid-state drive, for example. The nonvolatile storage 130 has a program storage area 131, and a fee table storage area 132.

The fee table storage area 132 stores prescribed correlations for calculating fees to be charged to the user based on printing. These correlations indicate the rates per page count based on printing coverage, paper size, and whether printing was performed in color or monochrome, for example.

The processor 110 is a device that performs data processing, such as a CPU. By executing a program stored in the program storage area 131, the processor 110 implements various processes, such as those in FIGS. 2, 10-14, and the like described later, including a process for performing data communications with the mobile terminal 300, the multifunction peripheral 200, and the delivery management server 400 connected to the network NT.

The interface 190 is a wired LAN interface or wireless interface for communicating with other devices. The interface 190 is connected to the network NT.

Delivery Management Server

The delivery management server 400 is installed at a company providing a delivery service for delivering various articles, for example. Although not shown in the drawings, the delivery management server 400 has a processor, a storage, and an interface for connecting to the network NT.

Multifunction Peripheral

The multifunction peripheral 200 may be a printer, a facsimile machine, or the like that the user owns at home, for example. The service provider that provides the delivery service may own the multifunction peripheral 200 and lend the multifunction peripheral 200 to the user. The multifunction peripheral 200 has a scanner 280, a printer 290, a processor 210, a storage 215, a display 240, an operation interface 250, a page counter 260, a communication unit 285, and a communication interface 270. The scanner 280, the printer 290, the processor 210, the storage 215, the display 240, the operation interface 250, the page counter 260, the communication unit 285, and the communication interface 270 are connected to each other via a bus 205.

The storage 215 includes a volatile storage 220, and a nonvolatile storage 230. The volatile storage 220 is DRAM, for example. The nonvolatile storage 230 is flash memory, for example. The nonvolatile storage 230 is provided with a program storage area 232. The program storage area 232 stores various programs including the printing program according to the embodiment for executing the sequence steps in FIGS. 2, 10-14, etc. described later. The printing program is prestored in the nonvolatile storage 230 as firmware, for example.

The processor 210 is a device such as a CPU that performs data processing. The processor 210 is an example of the controller. The processor 210 executes the printing program stored in the program storage area 232 and, in cooperation with the processor 110, implements a printing method according to the printing system 1 of the embodiment.

The display 240 is a liquid crystal display, for example. The operation interface 250 is a device that receives user operations. By operating the operation interface 250, the user can input various instructions into the multifunction peripheral 200. The communication interface 270 is a wired or wireless network interface for communicating with other devices. The communication interface 270 is connected to the network NT.

The scanner 280 optically reads an original or other object using photoelectric conversion elements such as a CCD or CMOS and generates scan data representing the read image.

The printer 290 feeds a sheet of paper from a paper tray and conveys the sheet with a conveying mechanism (not shown) while printing an image on the conveyed sheet according to a prescribed method. A case in which an inkjet system is used for printing will be taken up in the following description. Hence, the printer 290 forms images on paper using ink stored in ink cartridges 50 that are detachably mounted in a cartridge holder 51. The paper is an example of the printing medium; the ink cartridges 50 are an example of the cartridges; the cartridge holder 51 is an example of the cartridge mount portion; and the ink is an example of the consumable. More specifically, the ink cartridges 50 include a cyan ink cartridge a magenta ink cartridge, a yellow ink cartridge, and a black ink cartridge. However, when no distinction is being made, the cartridges will simply be called "ink cartridges 50" in the following description for convenience.

The communication unit 285 is a terminal, for example, that is electrically connected to a cartridge memory (a chip) possessed by each ink cartridge 50 mounted in the cartridge holder 51. As described above, the multifunction peripheral 200 of the embodiment can be used in a printing service offered under a prescribed printing agreement. An ink cartridge 50 that is used based on such an agreement (hereinafter simply referred to as a "subscription cartridge 50") has different specifications from an ordinary ink cartridge 50 purchased for use in the multifunction peripheral 200 by the owner of the multifunction peripheral 200, for example (hereinafter simply referred to as a "normal cartridge 50"). For this reason, each ink cartridge is provided with a cartridge memory (not shown) for storing cartridge information. The cartridge information includes cartridge type information indicating whether the ink cartridge 50 is a subscription cartridge 50 or a normal cartridge 50. The processor 210 acquires this cartridge information from the cartridge memory of each ink cartridge 50 via the communication unit 285. Based on the acquired cartridge information, the processor 210 can identify whether each ink cartridge 50 mounted in the cartridge holder 51 is a subscription cartridge 50 or a normal cartridge 50.

The page counter 260 has a function for incrementing or counting up a cumulative value of a printing count when the printer 290 executes a print under control of the processor 210. The printing count is more specifically the number of printed pages. For example, the page counter 260 counts one page every time the printer 290 prints one side of a single sheet of paper and counts two pages every time the printer 290 prints on both sides of a sheet. This page count is set to zero when the multifunction peripheral 200 is manufactured and shipped, for example, and thereafter is incremented without exception each time a print is performed. By controlling the page counter 260 to count pages and acquiring this page count from the page counter 260, the processor 210 can perform various processes described later. The page count accumulated by the page counter 260 is an example of the cumulative value for the printing count. Further, the procedure in which the processor 210 controls the page counter 260 to increment the page count is an example of the counting step, and the process for incrementing the count is an example of the counting process.

This page count can also be displayed on the display 240 in response to a suitable operation on the operation interface 250, excluding certain exceptions described later in which the processor 210 performs a process to hide (or not to display) the page count, for example. The display of the page count on the display 240 will be described later in greater detail.

Mobile Terminal

The mobile terminal 300 is an information terminal such as a smartphone or other mobile device possessed by the user. The mobile terminal 300 is connected to the network NT through wireless communications. While not shown in the drawings, the mobile terminal 300 has a processor, a storage, and an interface for connecting to the network NT. Alternatively, another information terminal such as a personal computer or a tablet computer may be used in place of the mobile terminal 300. In the following description, the information terminal such as the mobile terminal 300 or the personal computer will be generally called the "information terminal 300." The information terminal 300 is an example of the external display device.

Feature of the Embodiment

One feature of the printing system 1 according to the embodiment having the above configuration is how the display mode (or display style) for the page count obtained by the page counter 260 is modified when a printing agreement is entered. The display mode for the page count indicates a manner to display or not to display the page count. In other words, the display mode for the page count indicates a manner of representation concerning the page count.

When the printer 290 performs a print on a paper, the page count according to the page counter 260 is displayed on the display 240 under control of the processor 210, as described above. In a case that the user has entered an agreement to be charged a fee corresponding to the printing count within a prescribed interval, as described above, the printing count within the prescribed interval, i.e., the number of pages printed within the prescribed interval, will be a matter of concern to the user. However, simply displaying the page count described above on the display 240 could lead to confusion since the page count accumulated from the time the multifunction peripheral 200 was manufactured and shipped will not match the number of pages printed within the prescribed interval.

Process Flow

Therefore, the embodiment provides a control procedure for resolving this problem. The control procedure represents processes executed by the processor 210 of the multifunction peripheral 200, the processor 110 of the information management server 100, the processor of the delivery management server 400, and the processor of the information terminal 300. This control procedure will be described next with reference to the sequence chart of FIG. 2. In the following descriptions for FIG. 2 and other drawings, the processors have been omitted from the descriptions. Hence, expressions such as "the processor of the multifunction peripheral 200 executes" or "by the processor of the multifunction peripheral 200" have been simplified to "the multifunction peripheral 200 executes" and "by the multifunction peripheral 200."

In S1 of FIG. 2, the user performs a prescribed operation on the operation interface 250 of the multifunction peripheral 200 to display the page count of the page counter 260 on the display 240. Here, S1 is an example of the first display control step, and the process executed in S1 is an example of the first display control process. Here, it will be assumed that the user has not yet entered a printing agreement (described later) at this time and that either normal ink cartridges 50 or no ink cartridges 50 are currently mounted in the cartridge holder 51. An example of the display content on the display 240 at this time will be described next with reference to FIGS. 3A-3E.

Sample Display of the Page Count on the Multifunction Peripheral

The display 240 shown in n FIGS. 3A-3E has a touchscreen that also function as the operation interface 250. Accordingly, the display 240 cam be called the "touchscreen 240". FIG. 3A shows an initial screen 240A displayed on the touchscreen 240. The initial screen 240A includes icons representing a menu of various operations including "Fax,"

"Copy," and "Scan,", and a "Settings Menu" icon 241. By operating the "Settings Menu" icon 241 in this display, the user can display a settings screen 240B shown in FIG. 3B.

The settings screen 240B includes buttons displaying items for which settings are configurable. These items are "Maintenance," "Wi-Fi" (registered trademark), "Quiet Mode," "Tray Setting," "Fax Preview," and "All Settings." By operating the "All Settings" button in the settings screen 240B, the user can display an advanced settings screen 240C shown in FIG. 3C.

The advanced settings screen 240C includes buttons displaying advanced items that are configurable. These items include "General Setup," "Shortcut Settings," "Fax," "Network," "Print Reports," "Machine Info.," and "Initial Setup." By operating the "Machine Info." button, the user can display a device information display screen 240D shown in FIG. 3D.

Figure 3C:
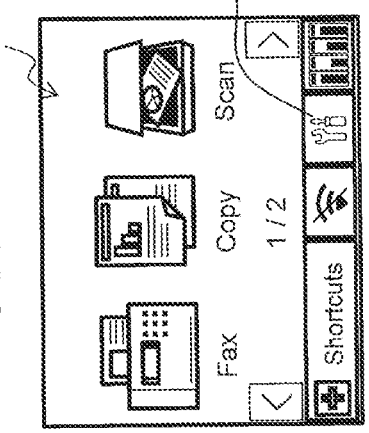
Figure 3B:
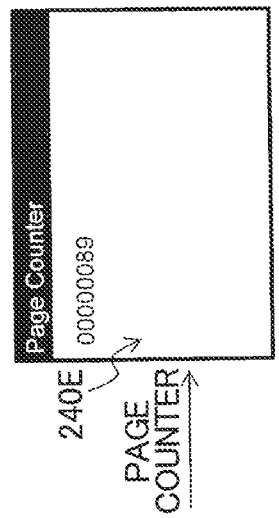
Figure 3D:
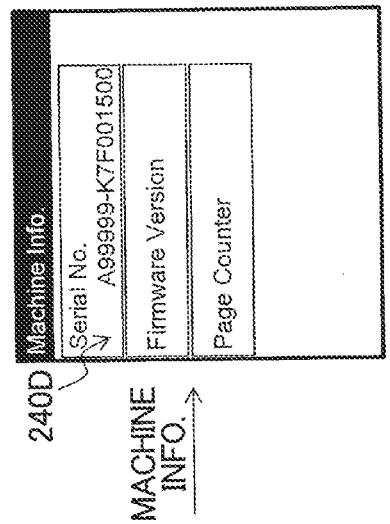
Figure 3E:
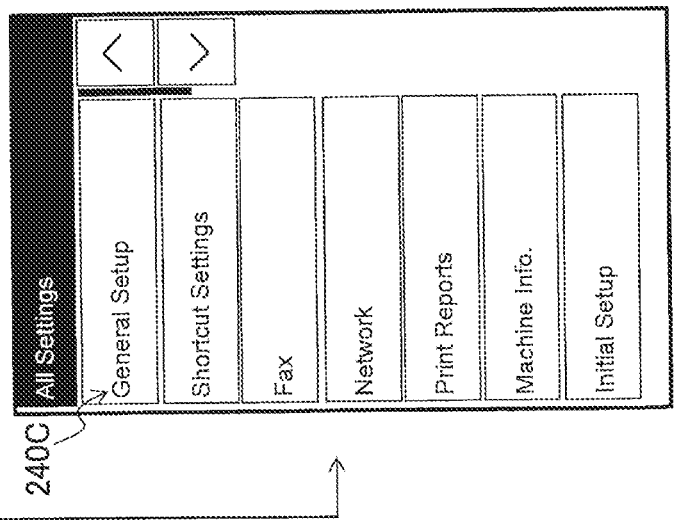

The device information display screen 240D includes buttons for selecting displayable items, including "Serial No.," "Firmware Version," and "Page Counter." By operating the "Page Counter" button, the user can display a page counter display screen 240E shown in FIG. 3E.

The page counter display screen 240E includes the item name "Page Counter" and the current page count "00000089" for the multifunction peripheral 200.

While not shown in the drawings, in a case that the user operates the "Print Reports" button in the advanced settings screen 240C shown in FIG. 3C and subsequently operates a "User Settings List" button displayed in the next screen, the user can print a report with the printer 290 that shows the current state of each setting. This report will also include the page count described above.

Displaying the Page Count on the Information Terminal

Returning to FIG. 2, in S3 the information terminal 300 displays the page count acquired from the multifunction peripheral 200 in conjunction with the process in S1. An example of the display content on the information terminal 300 at this time will be described with reference to FIG. 4.

Figure 4:
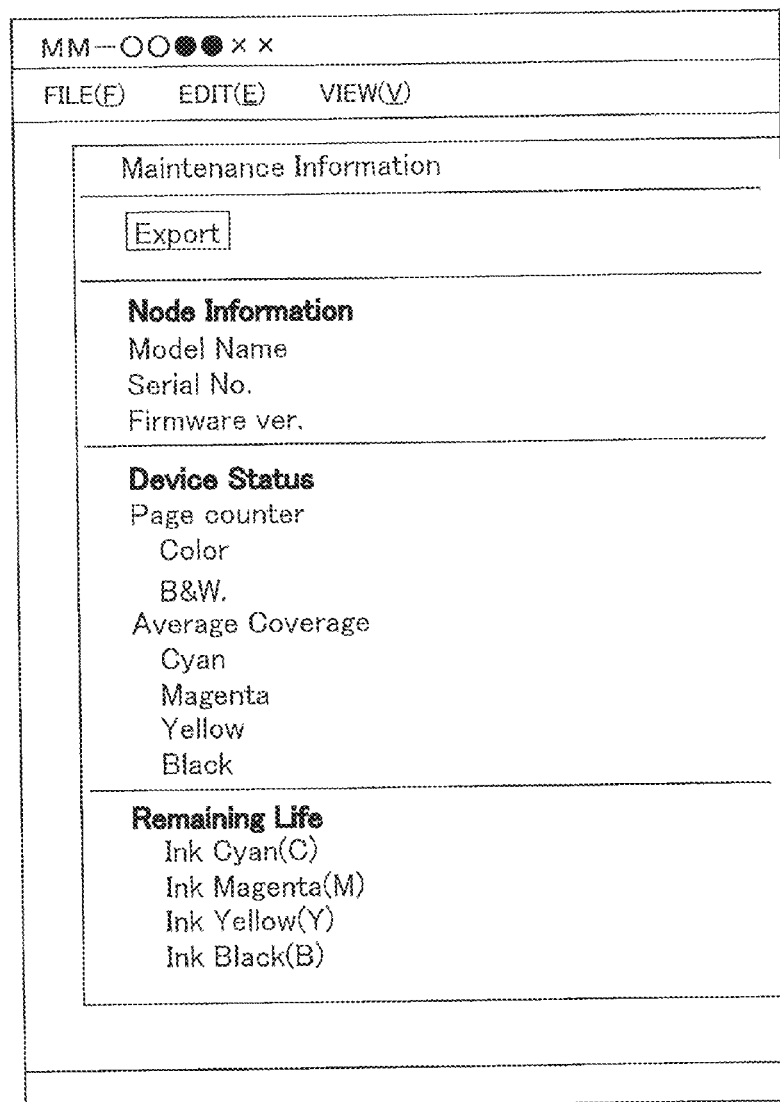
FIG. 4 is an explanatory diagram illustrating a web page which is represented by a file of an EWS format, includes a page count, and displayed on a display in the information terminal.

In the example of FIG. 4, information is displayed on the information terminal 300 according to a web page file of a prescribed format accessed through a prescribed URL, such as a file for an embedded web server (EWS). The web page file accessed through the prescribed URL is generated and managed by the multifunction peripheral 200. For example, the multifunction peripheral 200 transmits the web page file to the information terminal 300 in response to a request from the information terminal 300. The user performs a suitable operation on the information terminal 300 to access this URL, whereby in S3 the multifunction peripheral 200 outputs the web page file for the EWS to a browser on the information terminal 300. As a result, a web page, which describes various information including the value of the page count, such as that shown in FIG. 4 is displayed on the information terminal 300.

The web page shown in FIG. 4 has a main category "Maintenance Information." Under the "Maintenance Information" category are several intermediate categories such as "Node Information," "Device Status," and "Remaining Life."

Various items are provided under the category "Node Information" such as "Model Name," "Serial No.," and "Firmware Ver." A corresponding value or state quantity (not shown in the drawing) is displayed next to each item name.

Items listed under the category "Device Status" include "Page Counter" and "Average Coverage."

Additional items "Color" and "B&W" are provided under the item "Page Counter." A page count (not shown) is displayed next to the item "Color" for the number of pages that the printer 290 of the multifunction peripheral 200 has printed in color to this time. A page count (not shown) is also displayed next to the item "B&W" for the number of pages that the printer 290 has printed in monochrome to this time.

Items provided under the category "Average Coverage" include "Cyan," "Magenta," "Yellow," and "Black." The average coverage (not shown) for each of cyan ink, magenta ink, yellow ink, and black ink printed by the printer 290 to this time is displayed next to corresponding one of items "Cyan," "Magenta," "Yellow," and "Black."

Items provided under the category "Remaining Life" include "Ink Cyan (C)," "Ink Magenta (M)," "Ink Yellow (Y)," and "Ink Black (B)." The quantity of residual ink is detected according to a well-known method for each ink cartridge 50 mounted in the cartridge holder 51 of the multifunction peripheral 200, i.e., the cyan ink cartridge, the magenta ink cartridge, the yellow ink cartridge, and the black ink cartridge, and this residual ink quantity or the consumed ink quantity is calculated by the processor 210 for each ink cartridge 50 based on the detected results. This residual ink quantity or consumed ink quantity is an example of the consumption state, and this calculation process executed by the processor 210 is an example of the consumption state calculation process.

Although not shown in the drawing, the residual ink quantity or consumed ink quantity for each of cyan ink, magenta ink, yellow ink, and black ink calculated in the process described above are represented in the displayed web page in the information terminal 300 so that these quantities are arranged next to the corresponding items "Ink Cyan (C)," "Ink Magenta (M)," "Ink Yellow (Y)," and "Ink Black (B)."

Displaying the Consumption States

In the embodiment, the residual ink quantity or consumed ink quantity calculated according to the process described above is displayed on the display 240 of the multifunction peripheral 200 for each of cyan ink, magenta ink, yellow ink, and black ink. An example of this display content will be described next with reference to FIG. 5.

Figure 5:
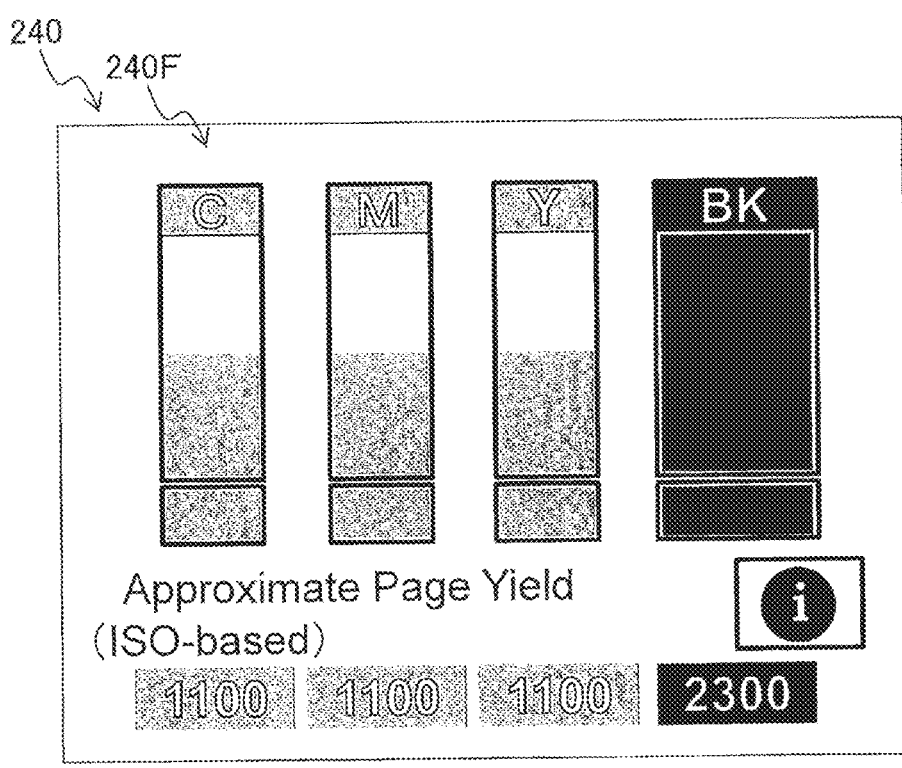
FIG. 5 is an explanatory diagram illustrating a state in which a remaining amount of consumables is displayed on a display in the multifunction peripheral.

The example in FIG. 5 shows a screen 240F displayed when the user performs a prescribed operation. The screen 240F schematically depicts the residual ink quantities for cyan ink, magenta ink, yellow ink, and black ink through virtual ink level lines in rectangular boxes. In this example, each of the cyan ink cartridge 50, the magenta ink cartridge 50, and the yellow ink cartridge 50 is in a state of approximately 50% residual quantity. In other words, about half of the ink in these cartridges has been depleted from the full state of a new cartridge. The black ink cartridge 50 is nearly new and thus has a residual quantity of approximately 100%. Note that consumed ink quantities representing the amounts of ink consumed from the cartridges in their new states may be displayed in place of these residual ink quantities.

Note that the number of pages that can be printed by the printer 290 based on the residual ink quantity for each ink cartridge 50 is calculated by the processor 210 according to a well-known method and displayed together with the residual ink quantity, as illustrated in the bottom of FIG. 5. The display for this example indicates that 1,100 more pages can be printed using the approximate 50% residual quantity of ink in each of the cyan ink cartridge 50, the magenta ink cartridge 50, and the yellow ink cartridge 50. The display also indicates that 2,300 more pages can be printed using the approximate 100% residual ink quantity for the black ink cartridge 50. In these cases, the numbers of pages that can be printed are an example of the consumption state, while the process performed by the processor 210 to calculate each number is an example of the consumption state calculation process.

The process performed by the processor 210 to display the screen 240F on the display 240, as illustrated in FIG. 5, is an example of the consumption state display process.

Returning to FIG. 4, in a case that the user operates the "Export" button in the web page, information for all items related to "Maintenance Information" described above is outputted from the information terminal 300 in a file of a prescribed file format, such as the csv format.

The example in FIG. 4 shows a case in which the page count and the like are displayed on the information terminal 300 through a web page file for the EWS, but the present invention is not limited to this configuration. For example, the user may access from the information terminal 300 a personalized web page based on user specific information that was previously associated with the user in the information management server 100 to display the user's personalized web page (not shown). Here, the personalized web page includes information similar to that shown in FIG. 4. In this case, the processor 210 of the multifunction peripheral 200 calculates the residual ink quantities, the consumed ink quantities, the numbers of printable pages, and the like, and transmits the calculated values to the information management server 100. Thus, the process executed by the processor 210 to calculate the residual ink quantities, the consumed ink quantities, the numbers of printable pages, and the like to be displayed in the personal page is an example of the consumption state calculation process.

Establishing a Printing Agreement

Returning to FIG. 2, after the processes in S1 and S3 have been completed as described above, the user performs a prescribed operation on the information terminal 300 indicating an intention to use the multifunction peripheral 200 under the printing agreement described above. In response to this operation, in S5 the information terminal 300 transmits an agreement request to the information management server 100, and thus the information management server 100 receives the agreement request.

In response, in S7 the information management server 100 prepares a monthly page counting function based on the page count held by the page counter 260 in the multifunction peripheral 200. This monthly page counting function counts only pages properly printed according to the printing agreement from among the number of pages counted by the page counter 260 during every specific interval after the printing agreement has been established. In the embodiment, the specific interval is one month, and the number of pages printed for each month (hereinafter simply called the "monthly page count") is counted as an example of the printing count for the specific interval. The monthly page counting function is provided in the information management server 100 in association with the user ID corresponding to the information terminal 300.

In S9 the information management server 100 transmits agreement start information (i.e., an activation instruction) to the multifunction peripheral 200, and the multifunction peripheral 200 receives this activation instruction. Through this action, the printing agreement described above is now established. The agreement start information is an example of the printing agreement completion notification.

Modifying the Display Mode for the Page Count

In response to the agreement being established, in S11 the multifunction peripheral 200 under control of the processor 210 modifies the display mode for the page count displayed in FIGS. 3A-3E. In the embodiment, the multifunction peripheral 200 hides the display. Step S11 is an example of the display mode modification step, and the process executed by the processor 210 in S11 is an example of the display mode modification process. A more detailed example of this process will be described next.

Figure 6A:
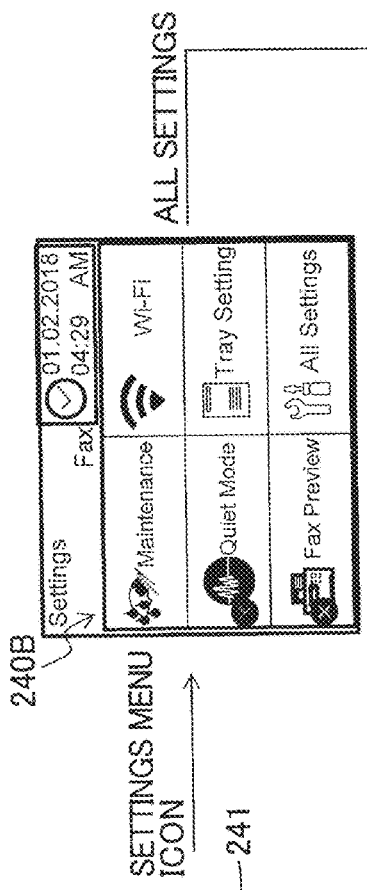
FIG. 6A-6D are explanatory diagrams illustrating a state in which the page counts is hidden on the display of the multifunction peripheral after a printing agreement is established.
Figure 6B:
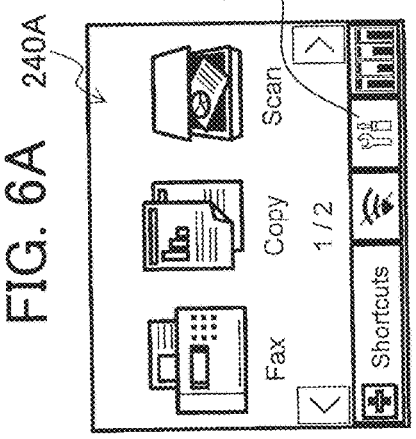
Figure 6C:
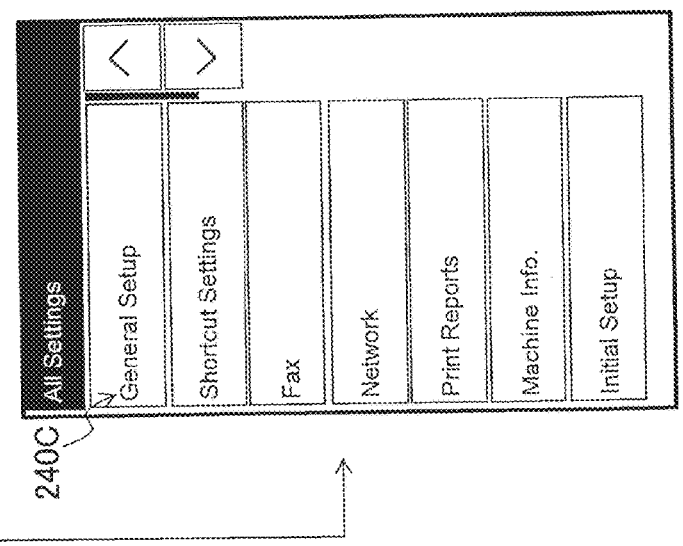
Figure 6D:
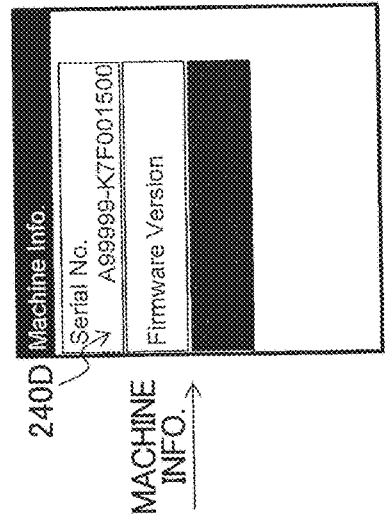

Sample Modification of the Display Mode for the Page Count on the Multifunction Peripheral The sequence of displays on the display 240 of the multifunction peripheral 200 will be described next with reference to FIGS. 6A-6D, which correspond to FIGS. 3A-3D described above. The device information display screen 240D shown in FIG. 6D is displayed on the display 240 after the user operates the "Settings Menu" icon 241 in the initial screen 240A, operates the "All Settings" button in the settings screen 240B, and operates the "Machine Info." button in the advanced settings screen 240C, as shown in FIGS. 6A-6C, which are identical to FIGS. 3A-3C. The device information display screen 240D shown in FIG. 6D differs from the device information display screen 240D in FIG. 3D in that the "Page Counter" button has been disabled and grayed out (i.e., hidden), while only the "Serial No." and "Firmware Version" buttons are displayed. Consequently, the user cannot switch to the page counter display screen 240E described in FIG. 3E. That is, the display of the page counter display screen 240E is removed (or eliminated) and unavailable. Alternatively, the "Page Counter" button may be left operable, but when switching to the page counter display screen 240E, the page count or both the page count and the item name "Page Counter" may be hidden.

Alternatively, rather than visually obscuring the "Page Counter" button as illustrated in FIG. 6D, the processor 210 may display just the "Serial No." and "Firmware Version" buttons in the device information display screen 240D while eliminating or not displaying the "Page Counter" button so that the button is inoperable.

Figure 7A:
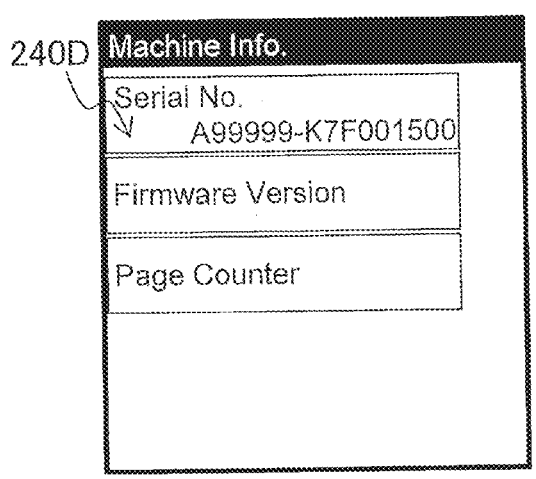
FIGS. 7A-7B are explanatory diagram illustrating a state in which a message is added to a display of the page count on the display of the multifunction peripheral after the printing agreement is established.
Figure 7B:
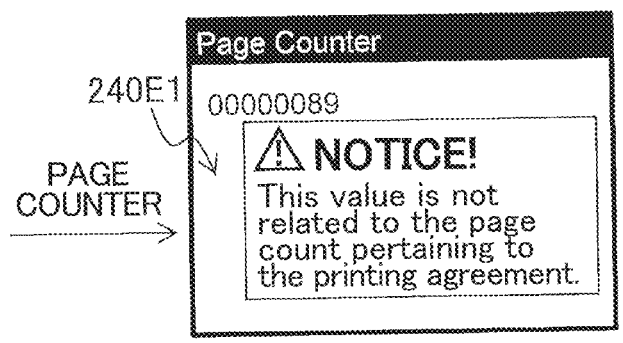

As another alternative, the processor 210 may display the "Page Counter" button in the device information display screen 240D, as illustrated in FIG. 7A, and may switch to a page counter display screen 240E1 shown in FIG. 7B when the "Page Counter" button is operated. As shown in FIG. 7B, the page counter display screen 240E1 may include a message in addition to the page count "00000089." In this example, the message is "Notice! This value is not related to the page count pertaining to the printing agreement." That is, the message indicates that the displayed value is not the subscription page count (describe later). The message is an example of the specific display.

Figure 8A:
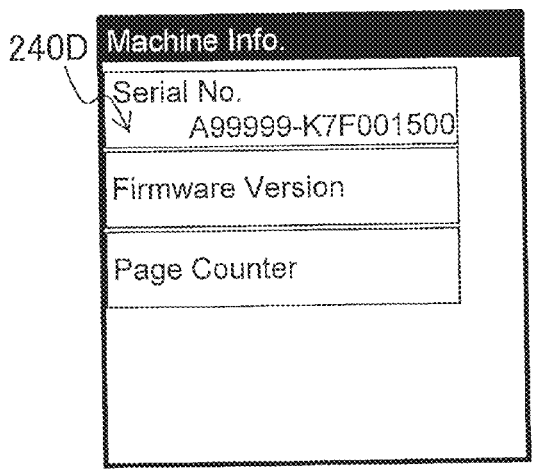
FIGS. 8A-8B are explanatory diagram illustrating a state in which the display of the page count is changed to a non-numeric character on the display of the multifunction peripheral after the printing agreement is established.
Figure 8B:
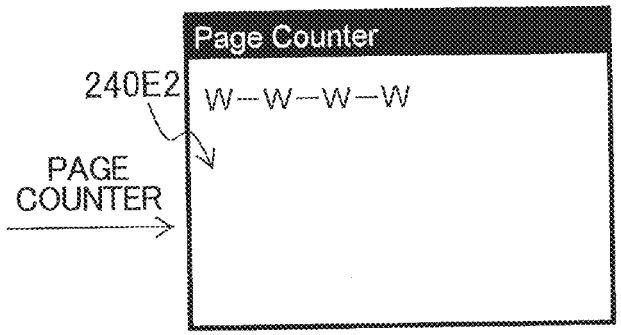

As another alternative, the processor 210 may display the "Page Counter" button in the device information display screen 240D, as shown in FIG. 8A, but may switch to a page counter display screen 240E2 shown in FIG. 8B when the "Page Counter" button is operated. As shown in FIG. 8B, the page counter display screen 240E2 includes a suitable character string other than numerical characters in place of the page count "00000089." In this example, a combination of alphabetic characters and symbols, such as "w-w-w-w", is displayed. Thus, modifying the display mode as described above may involve hiding, removing, not displaying, or graying out the displayed content; adding characters; or changing the displayed content to non-numeric characters, non-alphanumeric characters, or symbols. Hereinafter, the phrase "modifying the display mode" is meant to include any of the above modifications.

In addition to the process described above, the page count may also be removed from the report that is printed when the user operates the "Print Reports" button in the advanced settings screen 240C (FIG. 6C) and the "User Settings List" button in the subsequent screen.

Sample Modification of the Display Mode for the Page Count on the Information Terminal Returning to FIG. 2, in conjunction with the process of S11 and in response to the agreement being established, in S13 the information terminal 300 also modifies the display mode for the page count displayed as described above. Specifically, in S13 the information terminal 300 hides the display in the embodiment. A specific example of this process will be described next.

Figure 9:
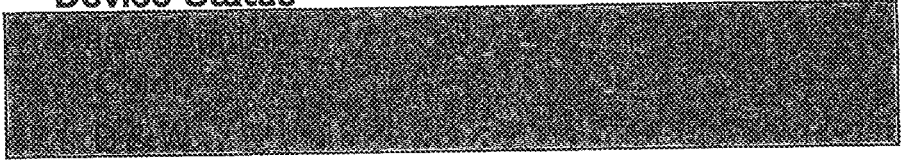
FIG. 9 is an explanatory diagram illustrating a web page which is represented by a file of an EWS format and in which the page count is hidden on the display in the information terminal.

A sample process for hiding or obscuring the display on the information terminal 300 will be described with reference to FIG. 9, which corresponds to FIG. 4 described earlier. In S13 the user of the information terminal 300 performs a prescribed operation on the information terminal 300 to access a URL for displaying a web page defined by a web page file for the EWS shown in FIG. 9, similarly to the process of S3. Similarly to S3, the multifunction peripheral 200 transmits the web page file to information terminal 300 in response to a request from the information terminal 300, for example. Note that the web page file transmitted in this case is configured so that the "Page Counter" and the corresponding page counts may be hided, removed, or not displayed while displaying only "Average Coverage" as the sole item under "Device Status." In the example shown in FIG. 9, the web page in FIG. 9 also includes the main category "Maintenance Information" and the intermediate categories "Node Information," "Device Status," "Remaining Life," and the like, similarly to FIG. 4.

However, while the section for the item "Average Coverage" is displayed under the category "Device Status," the section for the item "Page Counter" is grayed out so as to be hidden. Consequently, the items "Color" and "B&W" and their corresponding page counts displayed in FIG. 4 is also grayed out so as to be hidden.

As an alternative to hiding this section, the section for item "Page Counter" and the corresponding page counts may simply be removed or not displayed while displaying only "Average Coverage" as the sole item under "Device Status."

Further, the page counts may be eliminated from the information for all items related to "Maintenance Information" that is outputted when the user operates the "Export" button described above.

In a case that the user can also access and display a personal page on the information terminal 300, page counts and the like, which are included in the information displayed before the agreement is established, may similarly be hidden or removed when a printing agreement is established. Note that the page counts and the like may be hidden or removed from the web page defined by the web page file for the EWS while still being displayed in the personal page.

Additionally, the display mode for the residual ink quantities, the consumed ink quantities, the number of printable pages, and/or etc. displayed on the multifunction peripheral 200 or the information terminal 300 as described above may also be modified in a similar manner in S11 or S13 when a printing agreement has been established. For example, after the printing agreement is established, the consumption state such as the residual ink quantity, the consumed ink quantity, and the number of pages that can be printed may be hidden, may not be displayed, or may be grayed out for each mounted cartridge. Or, in a case that subscription cartridges of one or more colors are mounted in the corresponding cartridge holders 51 while normal cartridges of one or more remaining colors are remained in the corresponding cartridge holders 51 after the printing agreement is established, the residual ink quantity or the consumed ink quantity only for each subscription cartridge may be displayed, or the number of printable pages may be displayed only for each normal cartridge (non-subscription cartridge). In this case, the residual ink quantity, the consumed ink quantity, or the number of printable pages may be hidden or may not be displayed for each subscription cartridge.

Returning to FIG. 2, in S15 the multifunction peripheral 200 transmits an agreement acceptance notification (i.e., an activation notification) to the information management server 100, and in S17 the information management server 100 receives this activation notification. Here, the information management server 100 may issue a query to the multifunction peripheral 200, and the multifunction peripheral 200 may transmit the activation notification in response. In this way, the information management server 100 recognizes that the printing agreement described above has been concluded. Thereafter, the multifunction peripheral 200 establishes communications with the information management server 100 to periodically exchange information related to the service. In the embodiment, the information management server 100 manages information necessary for the service according to the agreement by communicating with the multifunction peripheral 200 and exchanging information every 12 hours. In S19 the information management server 100 transmits delivery information to the delivery management server 400 for delivering subscription ink cartridge(s) 50 to the user. Through this process, the company providing a delivery service ships subscription ink cartridge(s) 50 to the user. Since the subscription cartridges 50 are used to perform printing processes on the multifunction peripheral 200 according to S27 described later, the multifunction peripheral 200 uses a well-known method to detect whether ink in the subscription cartridges 50 has been depleted or is getting low. The information management server 100 follows the reduction in residual ink quantities through the periodic communications described above. When the information management server 100 grasps that the residual ink quantity (or quantities) for an ink cartridge(s) 50 becomes (or become) low, the information management server 100 transmits delivery information to the delivery management server 400 for delivering additional ink cartridge(s) 50 to the user, as in S19 described above. In this way, the user can simply use the multifunction peripheral 200 without having to worry about managing residual ink quantities in the ink cartridges 50.

After the user receives subscription cartridge(s) 50 that was (or were) shipped as described above, in S21 the user mounts the subscription cartridge(s) 50 in the cartridge holder 51 of the multifunction peripheral 200. At this time, the communication unit 285 acquires cartridge information for the mounted ink cartridge(s) 50. In S23 the multifunction peripheral 200 transmits the acquired cartridge information to the information management server 100. In response, the information management server 100 receives the transmitted cartridge information.

In S25 the multifunction peripheral 200 starts counting with a subscription counting function based on the page count kept by the page counter 260. This subscription counting function counts only the number of pages that are printed properly in accordance with the printing agreement from among all pages counted by the page counter 260 after the printing agreement was established. The number of pages printed properly in accordance with the printing agreement is an example of the subscription printing count. For example, the subscription counting function excludes counts of pages printed when performing a test print, when only a single side of the sheet could be printed under an agreement for duplex printing, and when misprints occur due to an issue on the multifunction peripheral 200, such as a sheet conveying problem. Hereinafter, the number of printed pages counted by this subscription counting function will be called the "subscription page count." The subscription printing count of the subscription counting function is an example of the cumulative value for the subscription printing count, and the process initiated by the processor 210 in S25 for incrementing the subscription page count is an example of the subscription counting process.

In S27 the printer 290 executes a printing process on the multifunction peripheral 200. When the page counter 260 increments the page count at this time, the subscription page count is similarly incremented for pages that were printed properly in accordance with the printing agreement. In S29 the multifunction peripheral 200 transmits various information including the subscription page count to the information management server 100.

In S31 the information management server 100 uses the monthly page counting function prepared in S7 to count the monthly page count based on the subscription page count received from the multifunction peripheral 200. Next, counting of the monthly page count will be described in greater detail. As described above, the information management server 100 periodically communicates with the multifunction peripheral 200 to exchange information. In this example, the periodic cycle is every 12 hours. The information management server 100 saves in the volatile storage 120 the subscription page count received from the multifunction peripheral 200 every periodic communication. Further, the information management server 100 updates the monthly page count for every specific interval, which is one month in this example. Hence, the information management server 100 resets the monthly page count to zero every month. The information management server 100 compares the subscription page count received from the multifunction peripheral 200 via a periodic communication (communication of periodic cycle (12 hours)) after the monthly page count was reset with the subscription page count received from the multifunction peripheral 200 just prior to resetting the monthly page count, and stores this difference as the current monthly page count. The information management server 100 repeats this process until the end of the specific interval, i.e., throughout the one-month period. In this way, the user can be aware of the latest monthly page count, which is updated every 12 hours through the periodic communications. Thus, the monthly page count is the number of pages printed during the current month. While the specific interval is set to one month in the embodiment in order to display the number of pages printed based on a monthly fee, the specific interval may be two months or one week, for example. In other words, the period may be adjusted appropriately for the form of service being offered. Further, while the periodic communications for updating the monthly page count are performed every 12 hours in the embodiment, the periodic communications may be performed on another cycle, such as every other day. Alternatively, updating the subscription page count may be performed at an irregular timing, such as after every printing operation.

In S33 the information management server 100 transmits the monthly page count counted in S31 to the multifunction peripheral 200, and in S35 the multifunction peripheral 200 receives/acquires this monthly page count. The process executed by the processor 210 of the multifunction peripheral 200 in S35 is an example of the specific count acquisition process. In the embodiment, the multifunction peripheral 200 does not perform any specific process to display the monthly page count acquired in S35. The same is true for the subscription page count, which the multifunction peripheral 200 begins counting in S25. That is, from the moment the multifunction peripheral 200 begins hiding the display of the page count in S11 described above, the multifunction peripheral 200 no longer displays any of the page count, the subscription page count, or the monthly page count at this time.

In S33 the information management server 100 also transmits the monthly page count found in S31 to the information terminal 300, and in S39 the information terminal 300 receives/acquires this monthly page count from the information management server 100. In S41 the information terminal 300 displays the monthly page count acquired from the information management server 100. Note that from the moment the information terminal 300 begins hiding the display of the page count in S13 described above, the information terminal 300 no longer displays the page count or subscription page count but displays only the monthly page count at this time. The information terminal 300 may display the monthly page count in conjunction with the multifunction peripheral 200. Further, the information terminal 300 may display the monthly page count together with various information such as information represented in the display shown in FIG. 9. Instead of the information management server 100, the multifunction peripheral 200 may transfer the monthly page count from the information management server 100 to the information terminal 300.

After having completed all desired printing, the user subsequently wishes to cancel the printing agreement described above, the user may perform a prescribed operation on the information terminal 300. In response to the user's operation, in S43 the information terminal 300 transmits a cancellation request to the information management server 100, and in S45 the information management server 100 receives this request. In S47 the information management server 100 ends counting of the monthly page count through the monthly page counting function initiated in S31 and notifies the multifunction peripheral 200 of this cancellation. In response, in S49 the multifunction peripheral 200 ends counting of the subscription page count according to the subscription counting function initiated in S25.

In S51 the information management server 100 then transmits agreement termination information (i.e., an inactivation instruction) to the multifunction peripheral 200, and the multifunction peripheral 200 receives this inactivation instruction. This action effectively cancels the printing agreement described above. In response, the multifunction peripheral 200 returns the display mode for the page count, which was modified in S11, to the original mode. Specifically, in S53 the multifunction peripheral 200 restores the hidden page count to the normal display mode used originally. The process executed in S53 is an example of the display mode restoration process. Subsequently, the sequence of FIG. 2 ends.

Effects of the Embodiment

In the embodiment described above, the display mode of the page count is modified when the user enters a printing agreement to pay a fee commensurate with the printing count within a specific interval. In other words, after the printing agreement is established, the page count displayed on the display 240 in S1 is hidden in S11 and thereafter is invisible or difficult to see for the user. This action can help prevent the confusion described above that could occur if the user were to see the page count.

Another feature of the embodiment is that the display mode for the page count is also modified on the information terminal 300 in S13 after the printing agreement has been established in conjunction with the modification of the display mode for the page count performed on the multifunction peripheral 200 in S11 described above. Accordingly, the display of the page count can also be hidden on the information terminal 300 so that thereafter the page count is invisible or difficult to see for a user viewing the information terminal 300. As a result, this method can prevent the user confusion described above.

Another feature of the embodiment is that the monthly page count indicating the number of pages printed within the specific interval in accordance with the printing agreement (one month in the above example) is displayed on the information terminal 300 (S41) when the monthly page count is transmitted from the information management server 100 (S33). Accordingly, after the printing agreement is established, the user of the information terminal 300 can view the number of pages that were properly printed according to the printing agreement over the latest specific interval. This arrangement can further improve user-friendliness.

Another feature of the embodiment is that the monthly page count is displayed on the information terminal 300 when various information is being displayed on the information terminal 300 in conjunction with the multifunction peripheral 200. Accordingly, after the printing agreement is established, the user of the information terminal 300 can view the monthly page count over the latest specific interval in accordance with the printing agreement. This interval is one month in the above example. Thus, this method can further enhance user-friendliness.

In the embodiment, the display mode is modified by hiding (see FIG. 6D) or removing the page count from the display. Accordingly, after a printing agreement has been established, the page count can reliably be made invisible or difficult to see for the user. Alternatively, the display mode can be modified as described in the embodiment by displaying a message when the printing agreement is established (see FIG. 7B) in addition to displaying the page count. By displaying the message indicating that the content of the page count may not necessarily be information the user wishes to know, the page count can reliably be made less likely to attract the user's eye after the printing agreement has been established.

Another feature of the embodiment is that the subscription page count is counted on the multifunction peripheral 200 according to the subscription counting function (S25). Further, the multifunction peripheral 200 acquires from the information management server 100 the monthly page count according to the printing agreement for the specific interval specified in the agreement (S35). In the above example, the specific interval is one month. When the agreement is established, the page count displayed to that point on the display 240 is hidden in S11, and neither the subscription page count nor monthly page count is also displayed on the display 240. In this way, the user at least no longer sees the page count after the printing agreement is established. This method can prevent confusion that could occur if the user were to see the page count, thereby enhancing user-friendliness.

Further, in conjunction with the changes or modifications made to the display on the display 240 of the multifunction peripheral 200 described above, the information terminal 300 displays neither the page count nor the subscription page count after an agreement has been established but does display the monthly page count. This avoids confusion that could occur if the user were to see the page count on the information terminal 300, while allowing the user to see the subscription page count for the most recent specific interval (the monthly page count in this example) based on the printing agreement, thereby further enhancing user-friendliness.

Another feature of the embodiment is that the processor 210 calculates the consumption states of consumables used in the multifunction peripheral 200 and displays these consumption states on the display 240. In the above example, the consumables are ink, and the processor 210 calculates and displays the residual quantities or consumed quantities of ink on the display 240 (see FIG. 5). As with the page count, the values for the consumption states that are normally detected may differ from the values the user wishes to know when the user has entered a printing agreement. Therefore, when a printing agreement is established in the embodiment, the processor 210 does not just modify the display mode for the page count on the display 240, but also modifies the display mode for the consumption states on the display 240. This method prevents the user from seeing the consumption states thereafter or makes it less likely the user will notice the consumption states thereafter. As a result, as with the page count described above, the embodiment can avoid confusion that might occur if the user were to see calculated consumption states, thereby further enhancing user-friendliness.

While ink is used as an example of the consumable in the above description and the residual quantity or consumed quantity of the ink is used as an example of the consumption state, the present invention is not limited to this example. For example, in the case of a multifunction peripheral 200 having a laser system, toner may be the consumable and the residual quantity or consumed quantity of the toner may be calculated as the consumption state. Additionally, the drum may be a consumable, and the remaining life of the drum may be calculated as a consumption state according to a well-known method.

Another feature of the embodiment is that the display mode for the page count is modified after the information terminal 300 receives the agreement start information (S11). Accordingly, user confusion described above can be avoided promptly after the printing agreement is completed.

Another feature of the embodiment is that in a case that a printing agreement concluded as described above is subsequently cancelled, the display mode for the page count, which was modified in S11, is restored to the original display mode (S53). Accordingly, once the printing agreement has been cancelled and the confusion described above can no longer occur, the page count is once again displayed on the display 240 in its original display mode to fulfill the intended function of notifying the user.

Modifications

While the disclosure has been described in detail with reference to the specific embodiment thereof, it would be apparent to those skilled in the art that various changes and modifications may be made therein without departing from the scope of the invention. In the following modifications, like parts, components, processes are designated with the same reference numerals to avoid duplicating description.

Figure 10:
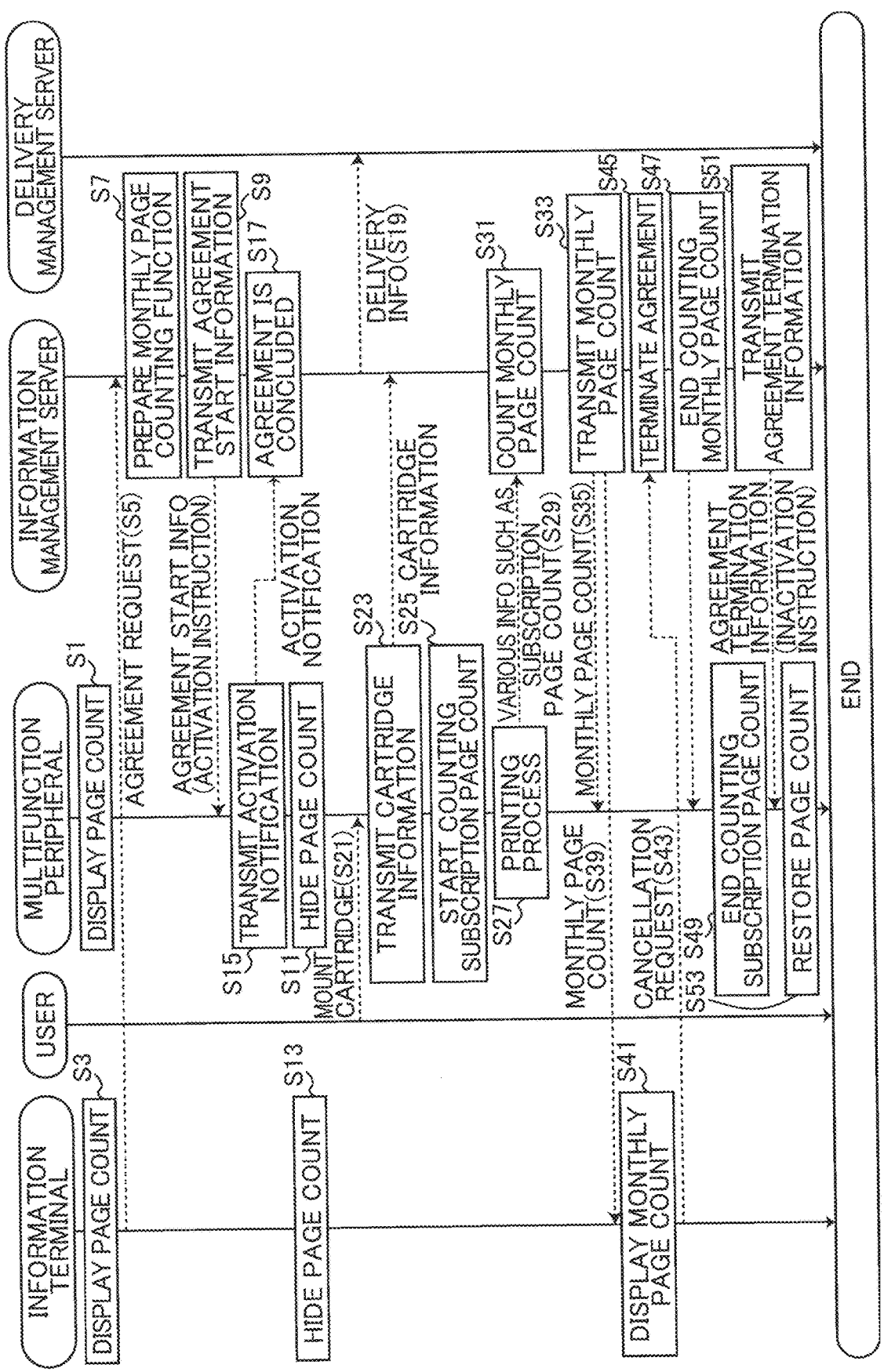
FIG. 10 is a sequence chart illustrating processes executed by the information terminal, the multifunction peripheral, the information management server, and the delivery management server according to a variation (1) to modify a display mode after transmitting an agreement acceptance notification to the information management server.

(1) Modifying the Display Mode after Transmitting an Agreement Acceptance Notification to the Information Management Server The sequence chart in FIG. 10, which corresponds to FIG. 2 described in the embodiment, shows a variation (1) of the process executed by the multifunction peripheral 200, the information management server 100, the delivery management server 400, and the information terminal 300.

In the variation shown in FIG. 10, steps S11 and S13 in FIG. 2 are executed after step S15. That is, after the multifunction peripheral 200 receives the agreement start information from the information management server 100 in S9, in S15 the multifunction peripheral 200 transmits an agreement acceptance notification to the information management server 100 and in S17 the information management server 100 receives this notification. Subsequently, in S11 the processor 210 hides the page count on the display 240 of the multifunction peripheral 200, and in S13 the information terminal 300 hides the page count. The remainder of the process is identical to that in FIG. 2 and will not be described here.

According to the present variation, the display mode for the page count is modified after the multifunction peripheral 200 receives the agreement start information for the printing agreement from the information management server 100 and transmits a response to the information management server 100. This process can with greater certainty avoid the user confusion described above after the printing agreement has been completed.

(2) Modifying the Display Mode after Cartridges are Mounted

Figure 11:
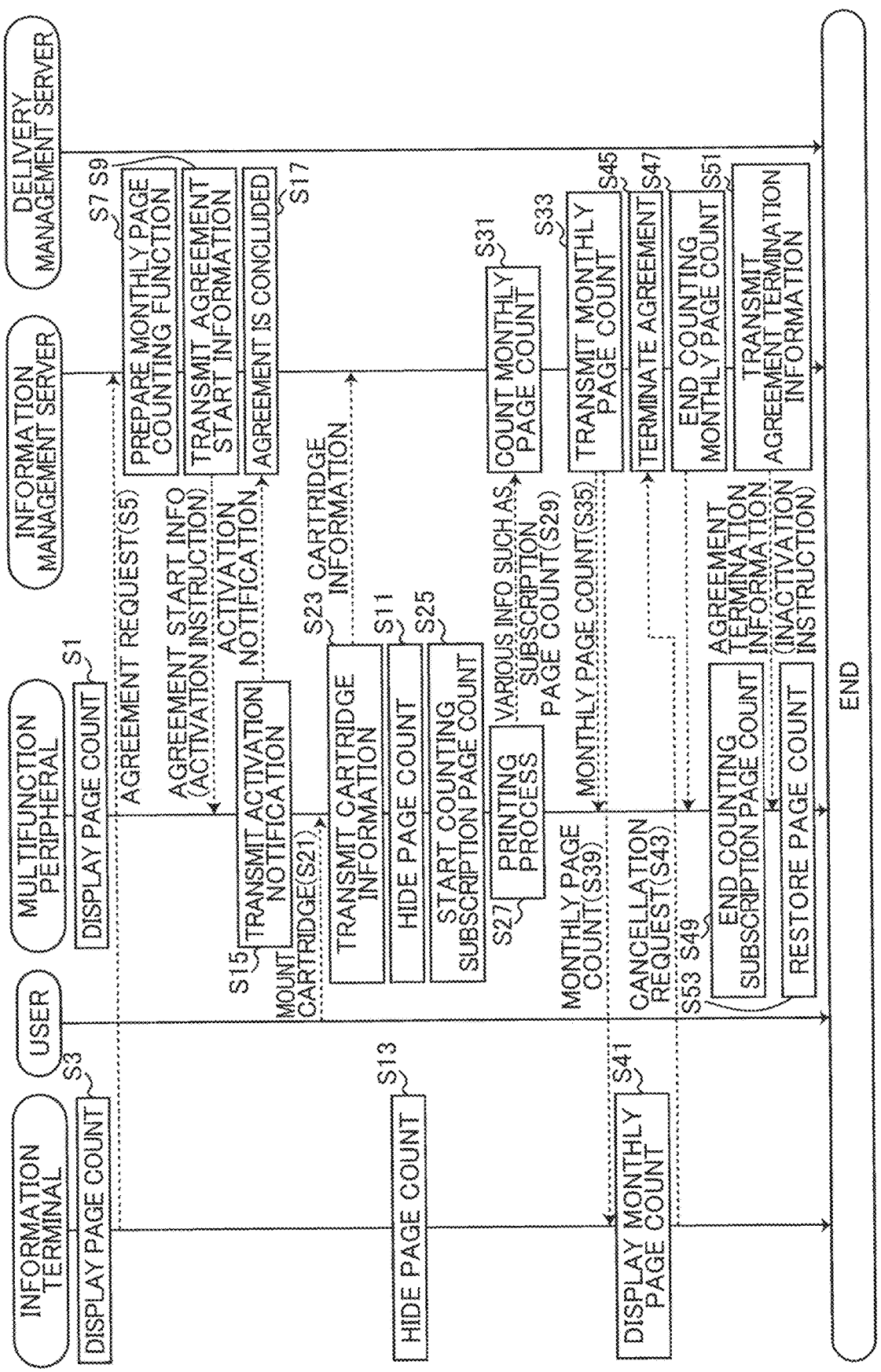
FIG. 11 is a sequence chart illustrating processes executed by the information terminal, the multifunction peripheral, the information management server, and the delivery management server according to a variation (2) to modify a display mode after cartridges are mounted.

The sequence chart in FIG. 11, which corresponds to FIG. 2 described above, shows a variation (2) of the process executed by the multifunction peripheral 200, the information management server 100, the delivery management server 400, and the information terminal 300.

In this variation, the type of subscription cartridges 50 used are pre-configured so that starting charges based on the printing agreement can be triggered by the subscription cartridges 50 being mounted in the cartridge holder 51. This type of ink cartridges 50 can function as normal ink cartridges 50 prior to a printing agreement being established, and can function as subscription cartridges 50 after a printing agreement is established based on control of the processor 210 in response to the subscription cartridges 50 being mounted in the cartridge holder 51. Hereinafter, this type of ink cartridge 50 will be called a "multifunction cartridge 50." The multifunction cartridge 50 is an example of the specific cartridge. These multifunction cartridges 50 are either included with the multifunction peripheral 200 when the user purchases and installs the multifunction peripheral 200 or are provided to the user at the same time of the purchase or the installation, for example. Thus, the process of S19 in FIG. 2 is omitted from FIG. 11.

In the variation shown in FIG. 11, steps S11 and S13 of FIG. 2 are executed after step S23. That is, in S9 the multifunction peripheral 200 receives agreement start information from the information management server 100 and in S15 transmits an agreement acceptance notification to the information management server 100. The information management server 100 receives the notification in S17. When the user subsequently mounts the multifunction cartridge(s) 50 in the cartridge holder 51 in S21, in S23 the multifunction peripheral 200 detects and identifies the multifunction cartridge(s) 50 being mounted, and thus transmits cartridge information acquired by the communication unit 285 to the information management server 100. Since a printing agreement has already been established when the cartridge(s) is (are) mounted (S15, S17), the multifunction cartridges 50 can function as subscription cartridges 50 under control of the processor 210.

Next, in S11 the processor 210 of the multifunction peripheral 200 hides the page count on the display 240, and in S13 the information terminal 300 hides the page count. The remainder of the process in FIG. 11 is identical to that in FIG. 2 and will not be described here.

According to the present variation, the display mode for the page count is modified after the multifunction cartridges 50 are mounted in the multifunction peripheral 200. This method can promptly prevent user confusion once the charging of fees according to the printing agreement begins as a result of the multifunction cartridges 50 being mounted.

(3) Displaying the Subscription Page Count

Figure 12:
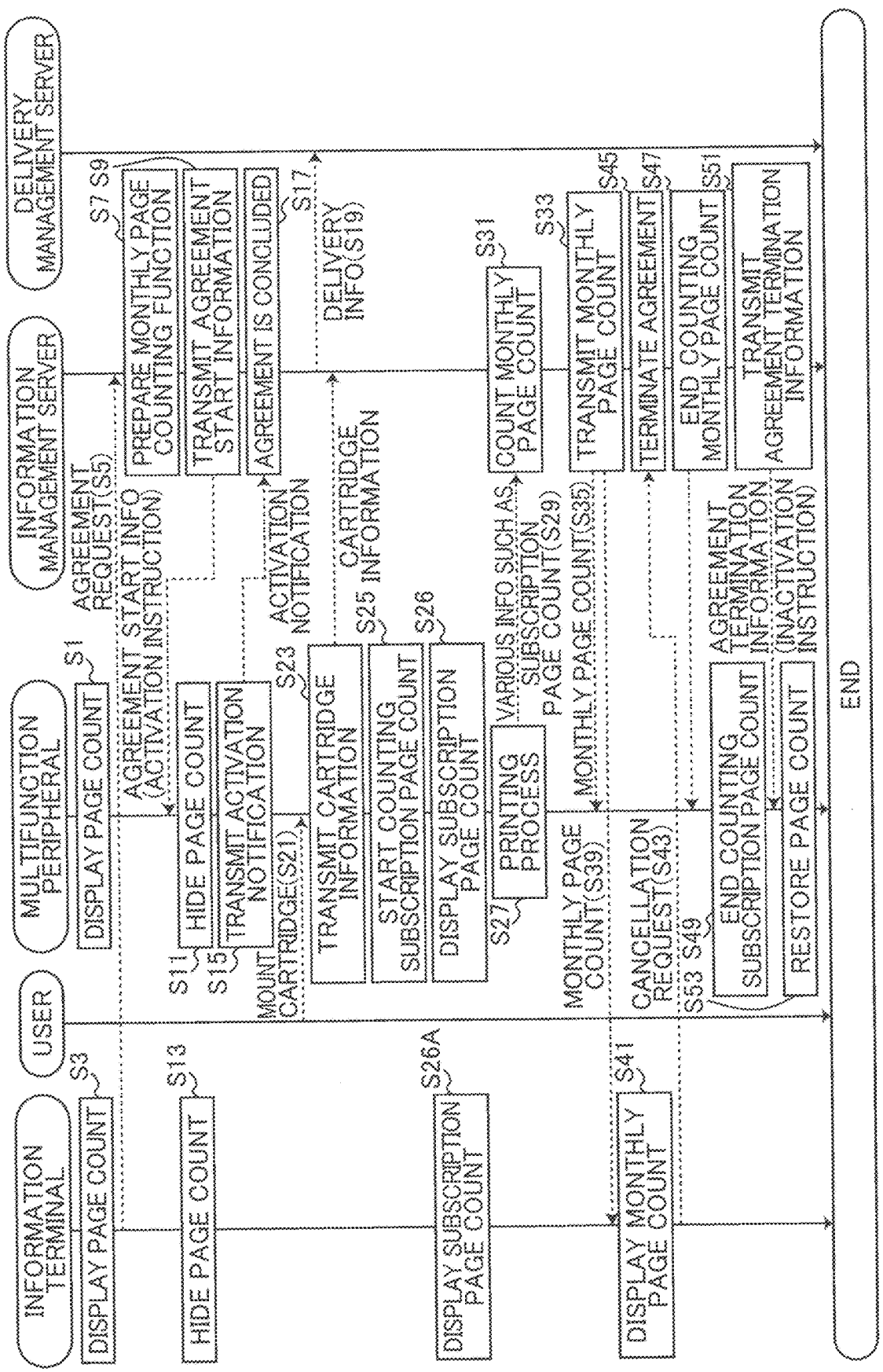
FIG. 12 is a sequence chart illustrating processes executed by the information terminal, the multifunction peripheral, the information management server, and the delivery management server according to a variation (3) to display a subscription page count after cartridges are mounted.

The sequence chart in FIG. 12, which corresponds to FIG. 2 described above, shows a variation of the process executed by the multifunction peripheral 200, the information management server 100, the delivery management server 400, and the information terminal 300.

In the variation shown in FIG. 12, steps S26 and S26A are executed between steps S25 and S27 in FIG. 2. That is, the multifunction peripheral 200 transmits cartridge information to the information management server 100 in S23 after the ink cartridges 50 are mounted and initiates counting with the subscription counting function in S25. Subsequently in S26 the processor 210 displays the subscription page count counted by the subscription counting function on the display 240. The process executed in S26 is an example of the second display control process. In S26A the information terminal 300 also displays the subscription page count in conjunction with the display process in S26. For example, the multifunction peripheral 200 transmits the web page file having the subscription page count to the information terminal 300 in response to a request from the information terminal 300, and in S26A the information terminal 300 displays the subscription page count based on the received web page file. Note that it is also possible to execute just one of steps S26 and S26A. The remaining process beginning from S27 is identical to that in FIG. 2 and will not be described here.

The present variation obtains the following effects. As described earlier, when entering a printing agreement, the user is not concerned with the page count but rather the subscription page count associated with the printing agreement for which the user has an obligation to pay. Accordingly, once a printing agreement is established in the present variation, the multifunction peripheral 200 counts the subscription page count in S25 and displays this subscription page count on the display 240 in S26. In this way, upon entering a printing agreement, the user can no longer see or has difficult seeing the normal page count but can see the subscription page count associated with the printing agreement that the user has entered. Thus, this method can improve user-friendliness.

In conjunction with the process of S26 performed on the multifunction peripheral 200, the information terminal 300 also displays the subscription page count associated with the printing agreement in the present variation (S26A). In this way, the user of the information terminal 300 can see the cumulative subscription page count associated with the printing agreement that the user has entered after the printing agreement is established. Thus, this method can improve user-friendliness.

(4) Displaying the Monthly Page Count on the Multifunction Peripheral

Figure 13:
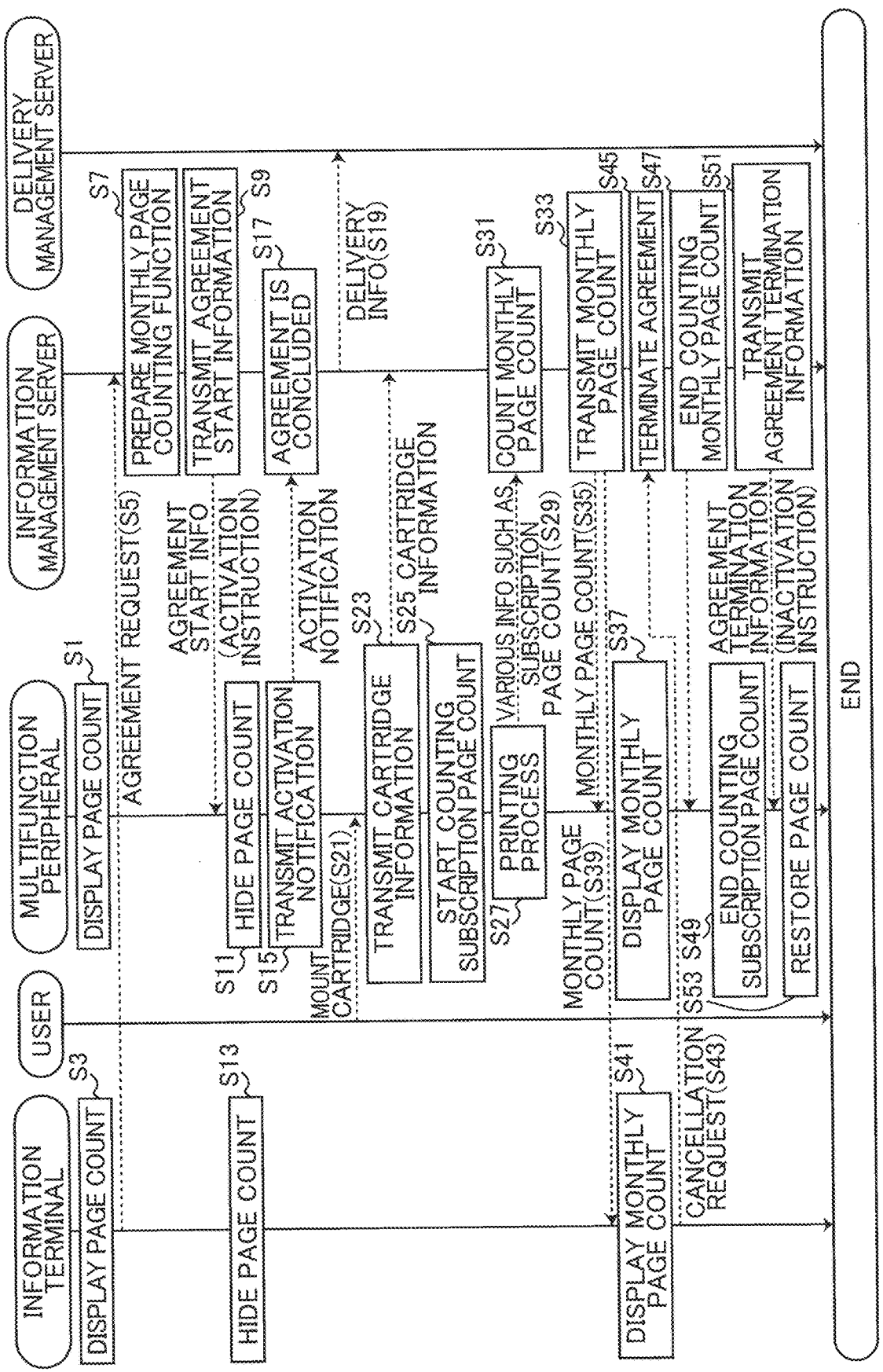
FIG. 13 is a sequence chart illustrating processes executed by the information terminal, the multifunction peripheral, the information management server, and the delivery management server according to a variation (4) to display a monthly page count after cartridges are mounted.

The sequence chart in FIG. 13, which corresponds to FIG. 2 described above, shows a variation of the process executed by the multifunction peripheral 200, the information management server 100, the delivery management server 400, and the information terminal 300.

In the variation shown in FIG. 13, a step S37 is executed following step S35 in FIG. 2. That is, in S27 the multifunction peripheral 200 executes a printing process, in S31 the information management server 100 counts the monthly page count based on the subscription page count received from the multifunction peripheral 200, and in S33 the information management server 100 transmits the monthly page count to the multifunction peripheral 200. In S35 the multifunction peripheral 200 receives the monthly page count. Next, in S37 the multifunction peripheral 200 displays on the display 240 the monthly page count received in S35. The process executed in S37 is an example of the third display control process. The remainder of the process is identical to that in FIG. 2 and will not be described here.

The present variation obtains the following effects. In a case that a printing agreement is established as described above, normally a specific interval is preset as a unit of payment, and the user is charged according to the content of printing over the specific interval. Thus, the primary concern for a user is how much the user will be obligated to pay. In this variation, the multifunction peripheral 200 acquires the monthly page count from the information management server 100 for the specific interval defined in the printing agreement (S33). In this example, the specific interval is one month. The multifunction peripheral 200 then displays the subscription page count acquired for the specific interval on the display 240 (S37). Accordingly, after a printing agreement has been established, the user is not only prevented from or made less likely to see the page count, but also is enabled to see the subscription page count for the latest specific interval based on the printing agreement. Thus, this method further enhances user-friendliness.

(5) Counting the Monthly Page Count on the Multifunction Peripheral

Figure 14:
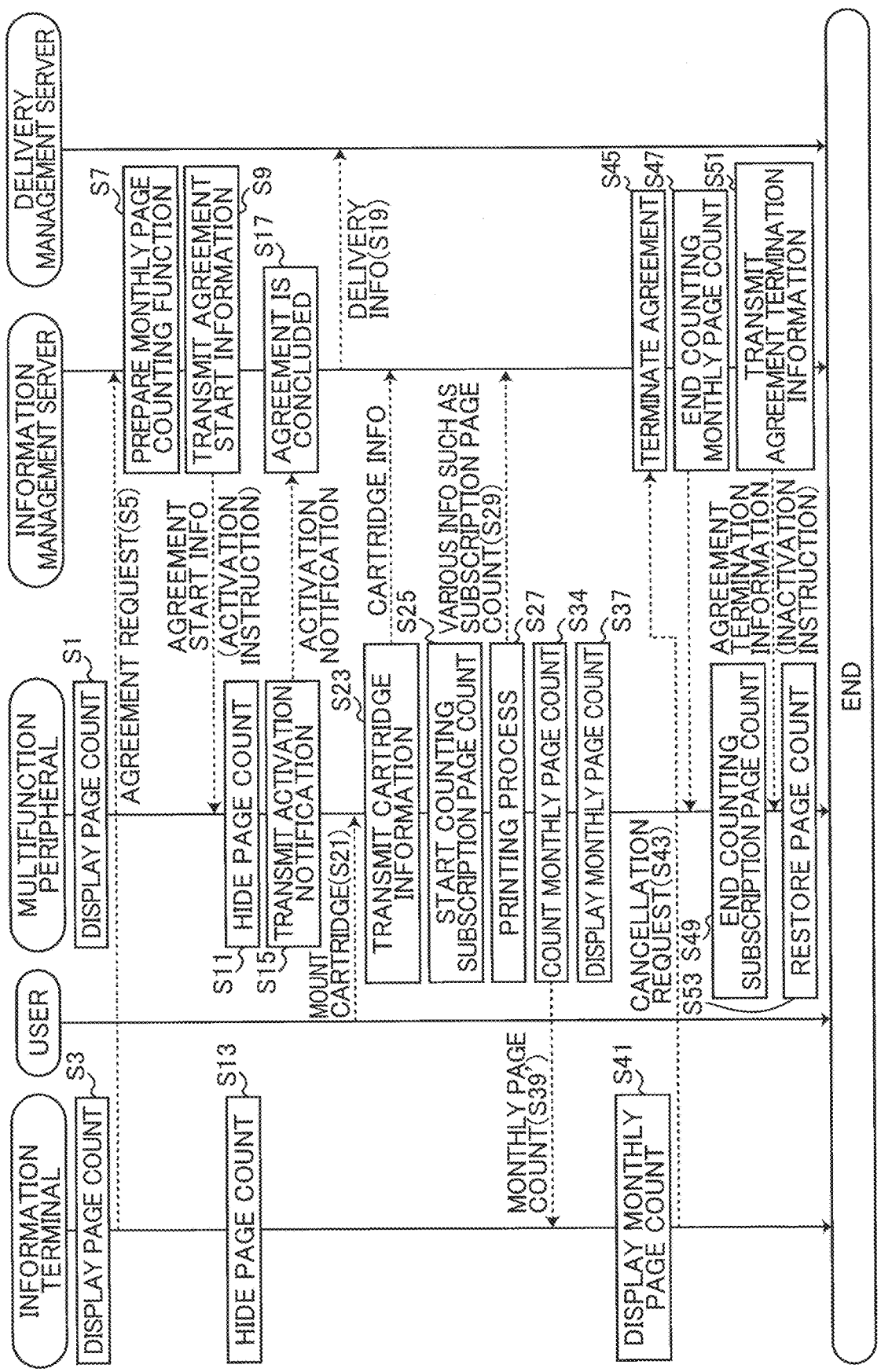
FIG. 14 is a sequence chart illustrating processes executed by the information terminal, the multifunction peripheral, the information management server, and the delivery management server according to a variation (5) in which the monthly page count is counted by the multifunction peripheral.

The sequence chart shown in FIG. 14, which corresponds to FIG. 2 described above, shows a variation of the process executed by the multifunction peripheral 200, the information management server 100, the delivery management server 400, and the information terminal 300.

In the variation shown in FIG. 14, steps S31, S33, and S35 of FIG. 2 have been eliminated, and step S34 and the same step S37 described in FIG. 13 are newly provided after step S27 executed on the multifunction peripheral 200. In other words, in S27 the multifunction peripheral 200 executes the printing process, and in S29 the multifunction peripheral 200 transmits the subscription page count to the information management server 100. Subsequently in S34 the multifunction peripheral 200 counts the monthly page count. The process executed in S34 is an example of the specific count calculation process. In S37 the multifunction peripheral 200 displays the monthly page count calculated in S34 on the display 240. In addition, the multifunction peripheral 200 transmits the monthly page count counted on the multifunction peripheral 200 to the information terminal 300 (S39'). Upon receiving this monthly page count, in S41 the information terminal 300 displays the count. The remainder of the process is identical to that in FIG. 2 and will not be described here.

In the present variation, after an printing agreement has been established, the multifunction peripheral 200 calculates monthly page counts using the monthly page counting function provided in the multifunction peripheral 200. In S11 the multifunction peripheral 200 hides the page count that had been displayed on the display 240, as described above. Note that the subscription page count is not displayed on the display 240. Hence, since the user at least cannot see the page count after the printing agreement is established, this method prevents confusion that may occur if the user were to see the page count, thereby enhancing user-friendliness. On the other hand, the monthly page count calculated as described above is displayed on the display 240 in the present variation (S37) after an agreement has been established. Thus, the user can see the subscription page count for the latest specific interval based on the printing agreement, thereby further enhancing user-friendliness.

(6) Other Variations

Based on the above description, the table in FIG. 15 summarizes typical display modes for the page count, the subscription page count, and the monthly page count to be displayed on the display 240 of the multifunction peripheral 200 and the information terminal 300 after a printing agreement is established.

In a pattern A of FIG. 15, all of the page count, the subscription page count, and the monthly page count are hidden or obscured (hereinafter simply referred to as "hidden") on the multifunction peripheral 200. For the information terminal 300, only the page count and the subscription page count are hidden, while the monthly page count is displayed. The embodiment described with reference to FIG. 2 corresponds to pattern A.

In a pattern B of FIG. 15, the page count is hidden, the subscription page count may be hidden or displayed on the multifunction peripheral 200, and the monthly page count is displayed on the multifunction peripheral 200. Similarly, the page count is hidden, the subscription page count may be hidden or displayed on the information terminal 300, and the monthly page count is displayed on the information terminal 300.

In a pattern C of FIG. 15, the page count is hidden, the monthly page count may be hidden or displayed on the multifunction peripheral 200, and the subscription page count is displayed on the multifunction peripheral 200. Similarly, the page count is hidden, the monthly page count may be hidden or displayed on the information terminal 300, and the subscription page count is displayed on the information terminal 300.

All of the patterns described above achieve the effect of preventing the confusion of the prior art that could occur if the user were to see the page count, provided that the display mode for the page count is modified after an agreement is established.

As described above, the ink cartridges 50 specifically include four cartridges respectively holding cyan ink, magenta ink, yellow ink, and black ink. Therefore, when calculating the subscription page count using the subscription page counting function described above, the count may be incremented for each ink cartridge, depending on whether the cartridge is a subscription cartridge 50 or a normal cartridge 50. For example, in a case that even one of the ink cartridges 50 is a subscription cartridge 50, the subscription page count may be incremented according to the printing performed in that state. In a case that all ink cartridges 50 are normal, the subscription page count need not be incremented when printing.

Further, the sequence charts shown in FIGS. 2, 10-14, and etc. do not limit the present invention to the steps indicated therein. Steps may be added or deleted, or their order may be rearranged.

Further, the methods according to the embodiment and the variations described above may be used in suitable combinations in addition to those already described.

What is claimed is:

1. A printing device configured to print an image on a printing medium, the printing device comprising:
a controller configured to:
increment a cumulative count value of a printing each time printing is performed by the printing device;
display on a display the cumulative count value of the printing; and
modify a display mode for the cumulative count value of the printing displayed on the display from a first display mode to a second display mode under a condition that a printing agreement is established, the first display mode being for a case that the printing agreement is not established and the second display mode being for a case that the printing agreement is established, the printing agreement being for charging fees depending on a printing count.

2. The printing device according to claim 1, wherein the printing agreement is for charging fees depending on the printing count within a specific interval.

3. The printing device according to claim 1, wherein the cumulative count value of the printing is displayed on an external display.

4. The printing device according to claim 3, wherein a display mode of the cumulative count value of the printing displayed on the external display is modified in conjunction with the modification of the display mode of the display under the condition that the printing agreement is established.

5. The printing device according to claim 1, wherein the controller is further configured to:
increment a cumulative count value of an agreement printing when printing is performed by the printing device according to the printing agreement; and
display on the display the cumulative count value of the agreement printing after the printing agreement is established.

6. The printing device according to claim 1, wherein the controller is further configured to:
acquire an agreement printing count within a specific interval when the printing agreement is established, the agreement printing count within the specific interval being counted when printing is performed by the printing device within the specific interval according to the established printing agreement; and
display on the display the acquired agreement printing count.

7. The printing device according to claim 1, wherein the display mode is modified from the first display mode to the second display mode by hiding or removing display of the cumulative count value of the printing which is previously displayed in the first display mode.

8. The printing device according to claim 1, wherein the display mode is modified from the first display mode to the second display mode by adding, to the cumulative count value of the printing displayed on the display, specific display corresponding to the established printing agreement in the second display mode.

9. The printing device according to claim 1, wherein the controller is further configured to:
increment a cumulative count value of an agreement printing when printing is performed by the printing device according to the printing agreement; and
acquire from a server an agreement printing count within a specific interval when the printing agreement is established, the agreement printing count within the specific interval being calculated by specifying an amount of increase in the cumulative count value of the agreement printing which is increased within the specific interval,
wherein after the printing agreement is established,
the display displays, according to the second display mode, none of the cumulative count value of the agreement printing, the agreement printing count within the specific interval and the cumulative count value of the printing; and
an external display displays neither the cumulative count value of the printing nor the cumulative count value of the agreement printing but displays the agreement printing count within the specific interval.

10. The printing device according to claim 1, wherein the controller is further configured to:
increment a cumulative count value of an agreement printing when printing is performed by the printing device according to the printing agreement; and
calculate an agreement printing count within a specific interval when the printing agreement is established, the agreement printing count within the specific interval being calculated by specifying an amount of increase in the cumulative count value of the agreement printing which is increased within the specific interval,
wherein after the printing agreement is established,
the display displays, according to the second display mode, neither the cumulative count value of the agreement printing nor the cumulative count value of the printing; and
the display displays the agreement printing count within the specific interval.

11. The printing device according to claim 1, wherein the controller is further configured to:
calculate a consumption state of a consumable in the printing device, the consumable being consumed while the printing device performs printing; and
display on the display the consumption state,
wherein the display mode for the cumulative count value of the printing and a display mode for the consumption state are modified.

12. The printing device according to claim 1, wherein the controller modifies the display mode for the cumulative count value of the printing after receiving a completion notification of the printing agreement from a server.

13. The printing device according to claim 1, wherein the controller modifies the display mode for the cumulative count value of the printing after receiving a completion notification of the printing agreement from a server and transmitting a response to the completion notification to the server.

14. The printing device according to claim 1, further configured to mount a cartridge, the cartridge being configured to supply a consumable,
wherein the controller modifies the display mode for the cumulative count value of the printing after a specific cartridge is mounted in the printing device, the specific cartridge being configured so that starting of charging based on the printing agreement can be triggered by the specific cartridge being mounted in the printing device.

15. The printing device according to claim 1, wherein the controller is further configured to:
restore the display mode of the cumulative count value of the printing from the second display mode to the first display mode.

16. The printing device according to claim 1, wherein the display mode for the cumulative count value of the printing indicates a manner to display or not to display the cumulative count value of the printing.

17. A non-transitory computer readable storage medium storing a set of program instructions installed on and executed by a computer included in a printing device configured to print an image on a printing medium, the set of program instructions, when executed by the computer, causing the printing device to:
increment a cumulative count value of a printing each time printing is performed by the printing device;
display on a display the cumulative count value of the printing; and
modify a display mode for the cumulative count value of the printing displayed on the display from a first display mode to a second display mode under a condition that a printing agreement is established, the first display mode being for a case that the printing agreement is not established and the second display mode being for a case that the printing agreement is established, the printing agreement being for charging fees depending on a printing count.

18. A method for controlling a display, comprising:
displaying on the display a cumulative count value of a printing in such a manner that the cumulative count value is increased each time printing is performed by a printing device; and
modifying a display mode for the cumulative count value of the printing displayed on the display from a first display mode to a second display mode under a condition that a printing agreement is established, the first display mode being for a case that the printing agreement is not established and the second display mode being for a case that the printing agreement is established, the printing agreement being for charging fees depending on a printing count.

* * * * *